United States Patent
Nishimura et al.

(10) Patent No.: US 9,281,523 B2
(45) Date of Patent: Mar. 8, 2016

(54) NON-AQUEOUS ELECTROLYTE SECONDARY BATTERY

(75) Inventors: Etsuko Nishimura, Hitachiota (JP); Toshio Abe, Tokai (JP); Chieko Araki, Hitachi (JP); Katsunori Nishimura, Hitachiota (JP); Takaaki Suzuki, Kasama (JP)

(73) Assignee: HITACHI, LTD., Tokyo (JP)

( * ) Notice: Subject to any disclaimer, the term of this patent is extended or adjusted under 35 U.S.C. 154(b) by 549 days.

(21) Appl. No.: 13/449,343

(22) Filed: Apr. 18, 2012

(65) Prior Publication Data

US 2012/0276455 A1     Nov. 1, 2012

(30) Foreign Application Priority Data

Apr. 27, 2011     (JP) .................................. 2011-098906

(51) Int. Cl.
| | |
|---|---|
| *H01M 4/62* | (2006.01) |
| *H01M 10/05* | (2010.01) |
| *H01M 4/133* | (2010.01) |
| *H01M 10/0525* | (2010.01) |

(52) U.S. Cl.
CPC ............. *H01M 4/621* (2013.01); *H01M 4/626* (2013.01); *H01M 4/133* (2013.01); *H01M 4/622* (2013.01); *H01M 10/0525* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| 6,294,290 | B1 * | 9/2001 | Kim ............................... | 429/217 |
| 7,195,844 | B2 * | 3/2007 | Suzuki et al. .................. | 429/232 |
| 2002/0012846 | A1 * | 1/2002 | Skotheim et al. ........ | 429/231.95 |
| 2004/0043294 | A1 | 3/2004 | Fukui et al. | |
| 2005/0058907 | A1 | 3/2005 | Kurihara et al. | |
| 2005/0064289 | A1 | 3/2005 | Suzuki et al. | |
| 2006/0127773 | A1 * | 6/2006 | Kawakami et al. ........... | 429/245 |
| 2007/0003836 | A1 | 1/2007 | Suzuki et al. | |
| 2008/0226988 | A1 * | 9/2008 | Minami et al. .............. | 429/231.5 |
| 2009/0098457 | A1 * | 4/2009 | Kwon et al. ................... | 429/209 |
| 2010/0021817 | A1 | 1/2010 | Kawakami et al. | |

(Continued)

FOREIGN PATENT DOCUMENTS

| | | |
|---|---|---|
| JP | 11-007942 | 1/1999 |
| JP | 2000-173622 | 6/2000 |
| JP | 2000-182671 | 6/2000 |

(Continued)

OTHER PUBLICATIONS

JP Office Action of Appln. No. 2011-098906 dated Feb. 25, 2014 with partial English translation.

*Primary Examiner* — Patrick Ryan
*Assistant Examiner* — Christopher Domone
(74) *Attorney, Agent, or Firm* — Baker Botts L.L.P.

(57) ABSTRACT

A long-life battery whose properties do not deteriorate after charge-discharges cycles is provided. A non-aqueous electrolyte secondary battery includes a cathode, an anode, and a non-aqueous electrolytic solution containing an electrolyte. At least one of the cathode and the anode includes a binder. The binder includes a layer having electron conductivity on a surface thereof. The binder improves the contact property between particles of the active materials of the battery and the conductivity in the electrode without impairing the binding property of the binder. Preferably, the binder includes a metal on the surface thereof and the metal does not form an alloy with lithium to further improve the lifetime of the battery.

13 Claims, 2 Drawing Sheets

(56) References Cited

U.S. PATENT DOCUMENTS

| | | |
|---|---|---|
| 2010/0075225 A1 | 3/2010 | Wilkins et al. |
| 2010/0323241 A1 | 12/2010 | Kawakami et al. |

FOREIGN PATENT DOCUMENTS

| | | |
|---|---|---|
| JP | 2001-102052 | 4/2001 |
| JP | 2001-155737 | 6/2001 |
| JP | 2002-260637 | 9/2002 |
| JP | 2004-288520 | 10/2004 |
| JP | 2005-63846 | 3/2005 |
| JP | 2005-78933 | 3/2005 |
| JP | 2005-108457 | 4/2005 |
| JP | 2005-190831 | 7/2005 |
| JP | 2005-285416 | 10/2005 |
| JP | 2007-165061 | 6/2007 |
| JP | 2009-538495 | 11/2009 |
| WO | WO 2008/115168 A2 | 9/2008 |

* cited by examiner

NON-AQUEOUS ELECTROLYTE SECONDARY BATTERY

CLAIM OF PRIORITY

The present application claims priority from Japanese Patent Application JP 2011-098906 filed on Apr. 27, 2011, the content of which is hereby incorporated by reference into this application.

FIELD OF THE INVENTION

The present invention relates to a non-aqueous electrolyte secondary battery, such as a lithium ion battery, and a power source and a device system using the battery.

BACKGROUND OF THE INVENTION

Non-aqueous electrolyte secondary batteries, typically including lithium ion batteries, are drawing attention as batteries for electric vehicles and energy storage since they have high specific energy densities. Electric vehicles includes so-called "zero-emission" electric vehicles without engine, hybrid electric vehicles with both an engine and a secondary battery, and plug-in hybrid electric vehicles charged with electricity directly from an electrical grid. Moreover, non-aqueous electrolyte secondary batteries are expected to be used in stationary energy storage systems for smoothly coordinating photovoltaic power generation or wind power generation with an electric power system.

For such various uses, lithium ion batteries are required to have large outputs. That is, in a power source for mobile use, an output performance of 0.1 hour rate or higher is required on startup and shutdown. Moreover, an output performance of 1 to 0.2 hour rate is required in a power source for stationary use for the purpose of interconnection, power backup during power failure, and load leveling. Herein, 1 hour rate represents a rate of charge or discharge when the rated capacity of a lithium ion battery is fully used in one hour. At 0.2 hour rate, a 5 times larger current than at 1 hour rate, and at 0.1 hour rate, a 10 times larger current is charged or discharged.

When a current value of charge or discharge of the lithium ion battery is increased, a current per unit area of an electrode (that is, current density) is increased, which lowers a voltage due to reaction resistance, electric resistance, or ion diffusion resistance. In particular, repeating charge-discharge cycles significantly lowers the voltage. This is because particles of a battery active material repeatedly expand and shrink by the charge-discharge cycles, and the electronic network between the particles is gradually cut. It should be noted that a battery active material used in this specification mean a cathode active material or an anode active material.

In order to avoid these problems, attempts to improve the lifetime of the charge-discharge cycles have been made by using a highly adhesive rubber-based binder or adding a conducting material having a minute particle structure such as carbon black (see JP-A-2000-173622, JP-A-2001-155737, JP-T-2009-538495, JP-A-2007-165061, JP-A-2005-190831, JP-A-2005-78933, JP-A-2005-63846, JP-A-2004-288520, and JP-A-2002-260637). The highly adhesive rubber-based binder is for absorbing a change in volume of battery active materials by the flexibility of the binder when particles of the battery active materials expand and shrink. Minute conducting materials such as carbon black is for filling a conducting material between the particles of the battery active materials to maintain the electronic network between the particles by the conducting material even if the volume of the battery active materials is changed.

JP-A-2000-173622 discloses an invention relating to an anode using carbon particles as a conducting material, which support only a metal not forming an alloy with lithium substantially. JP-A-2001-155737 discloses an invention for producing an electrode by using binder for a lithium ion secondary battery electrode including a non-conductive polymer whose surface is covered with a conductive polymer. JP-T-2009-538495 discloses an invention relating to a nanocomposite electrode including an intermediate layer region which electrically conducts with a current collector and a battery active material. JP-A-2007-165061 discloses an invention for adding a powder, or a sphere-like or columnar supporting material powder to the electrode to impart electron conductivity to the electrode. JP-A-2005-190831 discloses an invention relating to an electrode having a layer including an active material with a thickness of 120 to 2000 μm and having a conducting material and a binder with a content rate of 0.5 to 6% by mass of the total mass of the layer including the active material. JP-A-2005-78933 discloses an invention relating to composite particles including battery active material particles, conducting material particles, and binder particles. JP-A-2005-63846 discloses an invention characterized by mixing a battery active material with polymer particles including a conductivity-imparting agent containing conductive carbon and a binder. JP-A-2004-288520 discloses an invention relating to an electrode structure in which a conductive intermediate layer is disposed between a mixture layer and a current collector. JP-A-2002-260637 discloses an invention relating to an anode produced by sintering a layer of a mixture of an active material particles including silicon and a conductive metal powder in a non-oxidizing atmosphere on the surface of a current collector, which is a conductive metal foil having a surface roughness Ra of 0.2 μm or more.

An object of the present invention is to provide a long-life battery including an electrode having an electronic network in the interior, the electronic network unlikely deteriorating after charge-discharge cycles.

SUMMARY OF THE INVENTION

A non-aqueous electrolytic secondary battery includes a cathode, an anode, and a non-aqueous electrolytic solution containing an electrolyte. The inventors have conducted extensive studies to achieve the object stated above. As a result, means has been found for extending the lifetime of the battery by using a binder with electron conductivity imparted to the surface thereof for a cathode or an anode. Preferable binders with electron conductivity imparted to the surface thereof include a binder having a metal on the surface thereof and a binder having a metal and carbon on the surface thereof. It is preferable that a metal layer or a metal and carbon layer is formed on the surface as a uniform film or in the form of islands (in the form of covering a part of the surface of the binder).

Examples of metals used in the surface of the binder include copper, nickel, iron, titanium, aluminum, and an alloy of these metals. Preferably, the metal used in the surface of the binder does not form an alloy with lithium in an action potential of the electrode. Preferably, the thickness of the surface of the binder is 10 to 300 nanometers.

It should be noted that the present invention is also applicable to an air secondary battery, which includes an electrode for a non-aqueous electrolytic solution as an anode and an air electrode as a cathode. Therefore the non-aqueous electrolyte secondary battery in this specification includes a lithium-air secondary battery.

According to the above-mentioned structure of the non-aqueous electrolyte secondary battery, contact between particles of the active materials of the battery is improved, which allows the battery to have the long lifetime.

DETAILED DESCRIPTION OF THE PREFERRED EMBODIMENTS

A non-aqueous electrolyte secondary battery of the present invention includes a cathode, an anode, and a non-aqueous electrolytic solution containing an electrolyte. At least one of the cathode and the anode includes a binder, the binder including a layer having electron conductivity on the surface thereof. The binder improves the contact property between particles of the active materials of the battery and the conductivity in the electrode without impairing the binding property of the binder. Preferably, the binder includes a metal on the surface thereof and the metal does not form an alloy with lithium to further improve the lifetime of the battery, providing a long-life battery whose properties do not deteriorate after charge-discharges cycles. The details of the non-aqueous electrolyte secondary battery of the present invention will be described below.

Figure 1:
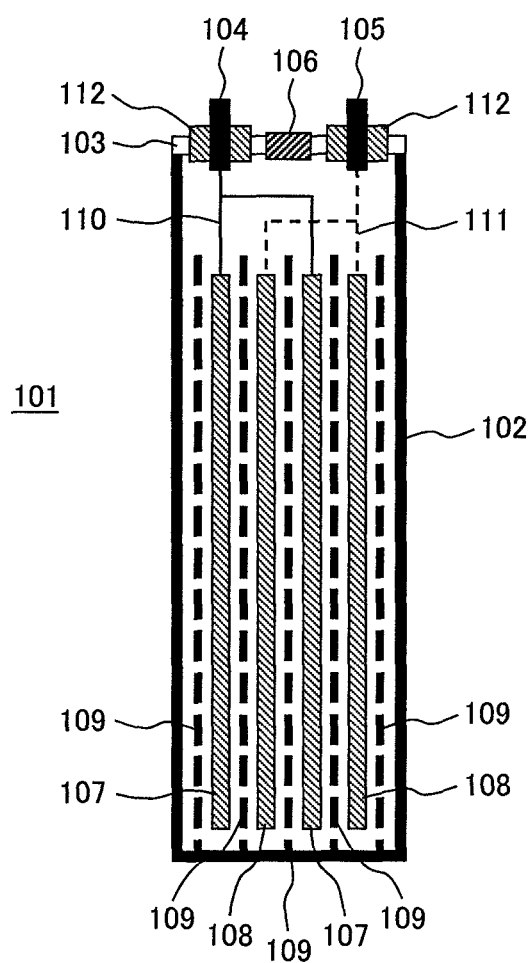
FIG. 1 is an example of a cross-section view of a non-aqueous electrolyte secondary battery.

FIG. 1 schematically shows the inner structure of a non-aqueous electrolyte secondary battery 101. The term "non-aqueous electrolyte secondary battery" collectively means an electrochemical device which occludes and releases ions into and out of the electrode in the non-aqueous electrolytic solution to store and utilize electric energy.

Each of the electrodes includes an electrode active material, a binder including a layer having electron conductivity on its surface, and a current collector. The binder is constituted by an inner part containing an elastic binder as the main component and by a surface layer having electron conductivity. A material used for the surface layer of the binder of the present invention is preferably a metal, and can be substituted by carbon. By employing such a dual structure, the binder has both functions of an electric conductor and an elastic body. As a result, the following three effects can be obtained compared to a case where each of a conducting material and a binder not including a layer having electron conductivity on its surface are mixed independently.

The first effect is to reduce the amount of the binder because battery active material particles can be electrically bonded efficiently with a small amount of the binder added. Metals have higher conductivity than carbonaceous conducting materials which have been often used. Therefore, a small amount of metals can lower the electric resistance of the entire electrode. As a result, the amounts of the binder and conductive materials are reduced and, therefore, the specific energy density of the battery is improved.

The second effect is that the electron transfer between the battery active material and the current collector is not prevented because the binder itself has conductivity even when the binder covers the surface of the current collector. Commonly used binders, which are electric insulating, prevent electron transfer when they are on the surface of the current collector.

The third effect is that the electronic network inside the electrode is always maintained even when the volume of the battery active material is changed by charge-discharge cycles because the binder of the present invention is elastic. Since the conducting material and the binder are integrated, the network can be retained following the expansion and shrinkage. The binder is compressed and restored in response to the expansion and shrinkage of the active material and, therefore, the electronic network is not destroyed. This effect extends the lifetime of the battery and is especially advantageous in cases involving changes in volume of the active material as in charge-discharge cycles.

The main component of the binder is selected from various elastic materials, such as fluorine-based rubber, styrene-butadiene rubber, ethylene-propylene rubber and acryl rubber. In particular, fluorine-based rubber and styrene-butadiene rubber are suitable, which have excellent elasticity and chemical stability. A functional group of oxygen or halogen may be introduced into a portion of the rubber component to provide a point for a metal to bond.

When a metal or an alloy which occludes lithium is used for the anode, changes in volume of the metal or the alloy resulting from occlusion and release are large. In order to prevent disintegration of the anode resulting from a change in volume, using a thermosetting resin may be desirable rather than using a rubber, which is highly elastic. In the present invention, an electrically conductive layer including a metal or carbon may be formed on the surface of a polyimide resin, a phenol resin or an epoxy resin for use in the binder. This is particularly effective for extending the lifetime of the anode involving great changes in volume.

The method for forming a conductive layer on the surface of the binder can be suitably selected. An example of methods for imparting conductivity on the surface will be described below. It should be noted that the method for forming a conductive layer on the surface of the binder is not limited to this example method. First, the binder is processed into a minute powder. The form of the powder may be spherical, string-like, fibrous or any optional form. The powder is selected to have a size such that its length is to be equal to or less than the thickness of the electrode. When the binder has a form of spherical, the diameter is the size. When the binder has a form of elliptic, the length of its major axis is the size. When the binder has a form of string-like or fibrous, the straight length with no pressure applied thereto is the size. This is because even if the binder is bent inside the electrode, the electrode can be produced as long as the straight length is not greater than the thickness of the electrode.

It is further preferable that the size of the binder powder is reduced to the size twice the length of the mean particle diameter of the battery active material powder or less. The size equal to or under twice the length of the mean particle diameter is a size which allows the binder to contact two battery active material particles. When the length of the binder is greater than twice the mean particle diameter of the battery active material, the binder sticks out from the width of two active material particles, which deteriorates the caulking property of the electrode. Selecting a fine binder having a size equal to or less than the average diameter of the battery active material particles is further preferable because the binder can be more easily caulked into the gaps of the particles of the active material.

The surface layer including a metal is formed on the binder powder stated above. As the metal, a pure metal, such as copper, nickel, iron, or titanium, or an alloy containing any of these metals can be selected. Note that it is important to select a metal which does not dissolve in the action potential of the cathode, such as titanium and aluminum, particularly when a binder having a conductive surface is used for the cathode.

Methods for forming the surface including the metal include electroless plating. Anions of a metal salt can be removed by cleaning with water or heat decomposition. Therefore, the type of the salt maybe nitrate salt, sulfate salt, acetate salt, oxalate salt and any other salts, and an appropriate compound is selected depending on its production method. For example, when the copper is formed on the surface of the binder, the binder is added to an aqueous solution of copper sulfate, and sodium borohydride is added to the mixture in the form of drops in a state that the mixture is sufficiently stirred, to cause copper to deposit on the surface of the binder. Thereafter, the resulting material is washed with water and dried, thereby obtaining a copper-plated binder. A commercially available plating bath may be used which is prepared by, in addition to the aqueous solution of copper sulfate, dissolving other copper salts. Metals used for plating may be nickel and iron for easy plating, as well as copper. By adding the binder to a solution prepared by dissolving a nickel salt or iron salt and by adding a reducing agent in the form of drops, nickel or iron can be deposited on the surface of the binder.

Another method used for forming the surface including the metal may be the mechanical fusion method utilizing the impact of the powder. In this case, the surface of the binder cannot be covered with a fine metal as in plating, but metal particles can be deposited at a high density and a similar electronic network can be formed inside the electrode. The metal can be deposited on the surface of the binder by the vapor deposition method.

The thickness of the metal layer may be 10 nm or more and 500 nm or less to maintain the elasticity of the binder and to utilize the conductivity of the metal layer at the same time. Forming the metal having a thickness of 10 to 300 nm on the surface of the binder is further preferable since the metal layer exhibits good conductivity. The thickness of the metal layer on the surface of the binder can be measured by a transmission electron microscope.

Methods for forming the surface including carbon include heat decomposition and oxidation decomposition of organic substances. Examples of organic substances include alcohols such as polyvinyl alcohols, oligosaccharides, saccharides such as dextrins, and water-soluble dietary fibers and water-soluble cellulose decomposition product. The organic substances can be carbonized by being mixed with the binder and being heat-treated in an oxidizing atmosphere, a reducing atmosphere or an inert atmosphere. The dry blending method can be applied to the mixing of the organic substances and the binder. By adding the binder to a solution of organic substances using a solvent such as lower alcohol and water and heat-treating the resulting slurry to vaporize the solvent, a binder on which a very small amount of organic substances deposited can be obtained. The heat treatment temperature is the decomposition temperature of the organic matters and is equal to or less than the temperature at which the binder decomposes. When an organic macromolecular binder is used, it is desirable to adjust the heat treatment temperature to 100° C. or higher and 400° C. or lower.

The thickness of the carbon layer may be 10 nm or more and 10000 nm or less to maintain the elasticity of the binder and to utilize the conductivity of the metal layer at the same time. Carbon, which has a flexible graphene structure, is suitable for forming thick films compared to metals. The thickness of the carbon layer on the surface of the binder can be measured by a transmission electron microscope. The interface between the binder and the carbon layer can be identified by a method of coloring the binder with osmium or a method of identifying the interface by an element such as fluorine in the binder.

If a catalyst having oxygen reducibility, such as $MnO_2$, $Fe_2O_3$, $RuO_2$, $IrO_2$, $TiO_2$, $MoO_2$ and Pt—Ni alloy, is mixed in or supported on this carbon layer, the carbon layer can be used for an air electrode of a lithium-air secondary battery.

It is desirable that the conductive surface covers the entire surface of the binder. However, even if a part of the surface of the binder is not covered and exposed, it is preferable that the binder and the battery active material particles are bonded by bringing the exposed surface into contact with the battery active material particles. It is not necessarily a requirement that the metal layer should cover the entire surface of the binder. The metal layer may be formed on the surface of the binder in the state of covering some portions of the surface, that is, in the form of islands. The state of the distribution of the conductive surface can be observed by using a scanning microscope. The composition of the metal can be identified by the energy dispersive X-ray analysis method.

When the battery active material has pores, the bonding strength between the binder and the electrode active material particles is increased, and conductive property having higher durability can be obtained. This is because some of the binder enters into the pores of the electrode active material, and a strong bonding force is generated. By producing the conductive surface on the binder in this state and coupling the particles of the electrode active material with the conductive surface, a network for causing electrons to flow between the particles can be formed.

The pores existing on the surface of the electrode active material have a diameter within a range from 10 nm to 1 µm, which is sufficient to allow a portion of the tip of the binder to enter into the pore.

The porous cathode active material is prepared as follows. Nitrate salts, halogenides, carbonates, hydroxides, or alkoxides containing lithium and a transition metal are mixed by wet-blending, and a composite of lithium and the transition metal is prepared by a known technique, such as alkaline precipitation method, sol-gel method, or spray pyrolysis method. The porous cathode active material particles can be obtained by heat-treating the composite.

As the porous anode active material, carbon particles having pores with diameters ranging from 10 nm to 1 µm can be obtained by pulverizing and granulating a graphite powder or a non-graphite powder. The organic substances for forming the conductive surface may be added to carbon particles to form a carbon coating.

The binder stated above can be mixed in either the cathode active material or the anode active material or in both of the cathode active material and the anode active material to produce the cathode and/or the anode. The battery active material and the binder having the metal layer are mixed, and a solvent is mixed into the mixture to prepare a slurry for the cathode and/or the anode. The type of the binder may be the same or different for the cathode and anode. Desirably, the solvent to be used in the present invention is unlikely to penetrate the binder. This is because if the solvent penetrates the binder, the binder swells and the metal in the surface layer may peel off. To overcome this problem of peeling, an appropriate solvent is to be selected by adding the solvent to the binder including the metal layer and checking the presence or absence of peeling of the surface after the binder has swelled. A scanning electron microscope and a transmission electron microscope can be used to this checking.

With reference to FIG. 1, a lithium ion battery will be described below as a typical example. The non-aqueous electrolyte secondary battery 101 includes an electrode group in a battery container 102 in a tightly sealed state. The electrode group includes a cathode 107, an anode 108, and a separator 109 disposed between the two electrodes. The battery container 102 has a lid 103 in an upper part, and the lid 103 has a cathode external terminal 104, an anode external terminal 105, and a liquid injection port 106. After the electrode group is accommodated in the battery container 102, the lid 103 is placed on the battery container 102 and the outer periphery of the lid 103 is welded to integrate the lid 103 with the battery container 102. Methods for attaching the lid 103 to the battery container 102 include swaging and adhesion as well as welding.

Typical examples of the cathode active materials include $LiCoO_2$, $LiNiO_2$ and $LiMn_2O_4$. Other examples thereof include $LiMnO_3$, $LiMn_2O_3$, $LiMnO_2$, $Li_4Mn_5O_{12}$, $LiMn_{2-x}M_xO_2$ (with the proviso that M=Co, Ni, Fe, Cr, Zn and Ta, and x=0.01 to 0.2), $Li_2Mn_3MO_8$ (with the proviso that M=Fe, Co, Ni, Cu, Zn), $Li_{1-x}AxMn_2O_4$ (with the proviso that A=Mg, B, Al, Fe, Co, Ni, Cr, Zn and Ca, and X=0.01 to 0.1), $LiNi_{1-x}M_xO_2$ (with the proviso that M=Co, Fe and Ga, and x=0.01 to 0.2), $LiFeO_2$, $Fe_2(SO_4)_3$, $LiCo_{1-x}M_xO_2$ (with the proviso that M=Ni, Fe and Mn, and x=0.01 to 0.2), $LiNi_{1-x}M_xO_2$ (with the proviso that M=Mn, Fe, Co, Al, Ga, Ca and Mg, and x=0.01 to 0.2), $Fe(MoO_4)_3$, $FeF_3$, $LiFePO_4$, $LiMnXPO_4$ (X is Fe, Ni and the like), and a $Li_2MnO_3+LiMnO_2$ solid solution.

The diameter of the cathode active material particles is defined to be the thickness of the mixture layer or less. When the cathode active material powder includes coarse particles having a size equal to or greater than the thickness of the mixture layer, the coarse particles are removed by sieve classification or air classification method in advance to prepare particles having the size equal to or less than the thickness of the mixture layer.

When the cathode includes the binder having the metal layer, the cathode active material powder and the binder having the metal layer are mixed, a solvent being added to the mixture, and the mixture being sufficiently mixed or dispersed to prepare a slurry. Examples of the solvent are an organic solvent and water. Any solvent may be used as long as it does not degenerate the binder.

The mixing ratio of the cathode active material and the binder is within a range from 80:20 to 99:1 by weight ratio. In order to sufficiently exhibit the conductivity and enable charge and discharge with a large current, it is desirable that the proportion of the cathode active material is lower compared to the above mixing ratio of 99:1. In order to increase the specific energy density of the battery, it is preferable that the proportion of the cathode active material is larger compared to the mixing ratio of 90:10.

When the binder having the conductive surface is mainly used for a binder, that is, when the amount of the binder of the present invention added in the composition other than the cathode active material in the cathode is larger than 50%, a carbonaceous conducting material or a binder with no metal coating can be partly added. Even if the carbonaceous conducting material and the binder without conductive surface are simultaneously used, the above three functions of the binder having the conductive surface are exhibited since the binder having the conductive surface is the main component.

The metals used for the surface of the binder include a metal which does not form an alloy or an intermetallic compound with lithium. If the metal forms an alloy with lithium, it reacts with an electrolytic solution to form a coating which hardly passes electrons and ions through, or the metal falls off from the binder due to a change in volume of the metal to degenerate the binder having the metal layer. The metal is not limited to the materials stated above as long as it does not react with lithium. When the metal is used for the cathode, it is especially important to select a metal which does not dissolve in the action potential of the cathode and does not form an alloy or an intermetallic compound with lithium. Titanium and aluminum are suitable for the cathode.

As the conducting material, known materials such as graphite, amorphous carbon, graphitizable carbon, carbon black, activated carbon, carbon fiber and carbon nanotube can be used. Conductive fibers include fibers produced by carbonizing raw materials such as vapor phase grown carbon or pitch (by-products such as petroleum, coal and coal tar) at a high temperature, and carbon fibers produced from acrylic fiber (Polyacrylonitrile). Moreover, a metallic material which is not oxidized and dissolved at charge/discharge potential (normally 2.5 to 4.2 V) of the cathode and has lower electric resistance than the cathode active material, anti-corrosion metals such as titanium and gold, carbides such as SiC and WC, and fibers including nitrides such as $Si_3N_4$ and BN may be used. The production method of the conducting material may be an existing production method such as the fusion method and the chemical vapor deposition method.

The cathode 107 is produced by applying the slurry stated above onto the cathode current collector and by evaporating and drying the solvent. Any current collector can be used for the cathode current collector, regardless of the material, shape, method for producing and other properties. For example, aluminum foils having a thickness of 10 to 100 μm, aluminum perforated foils having a thickness of 10 to 100 μm and a bore diameter of 0.1 to 10 mm, expand metals, foam metal sheets and other materials are used. As for the material, stainless steel, titanium, and other materials, in addition to aluminum, are applicable.

As applying the slurry onto the cathode, any known method can be employed without limitation, such as the doctor blade method, dipping method and spraying method. The cathode can be produced by depositing the slurry for the cathode onto the current collector, drying the organic solvent, and then pressing and forming the cathode by roll pressing. Mixture layers can be laminated on the current collector by repeating steps from applying to drying several times.

The anode 108 includes an anode active material, a binder, and a current collector. A case where anode active material powder and the binder are mixed and the anode includes a binder having a conductive layer will be described. The anode active material is not particularly limited. Examples of the anode active material include aluminum which forms an alloy with lithium, silicon, tin, magnesium, an alloy of these metals, and metal oxides such as lithium titanate. Moreover, the examples also include carbonaceous materials including graphite and amorphous carbon which are capable of electrochemically occluding and releasing lithium ions. These materials may be suitably selected and used for the anode of the present invention. For example, the anode active material is a carbon material having a graphene structure. The anode active material may be a mixed anode of materials such as graphite, graphitizable carbon and non-graphitizable carbon, or a mixed anode or composite anode produced by adding a metal or an alloy to the carbon material. That is, usable anode active materials include carbonaceous materials such as natural graphite, artificial graphite, mesophase carbon, expanded graphite, carbon fiber, gas phase grown carbon fiber, pitchbased carbonaceous material, needle coke, petroleum coke, polyacrylonitrile-based carbon fiber, carbon black, and amorphous carbon materials synthesized by heat decomposition of a cyclic hydrocarbon compounds containing a five-membered ring or six-membered ring or cyclic oxygen-containing organic compounds, which are capable of electrochemically occluding and releasing lithium ions. Moreover, conductive high-molecular materials including polyacene, polyparaphenylene, polyaniline, and polyacetylene can be also used for the anode in combination with a carbon material having a graphene structure such as graphite, graphitizable carbon and non-graphitizable carbon.

Since the anode active material which is generally used is a powder, the binder is mixed into the powder to bond powder particles, while the powder is adhered to the current collector. It is desirable that the diameter of the anode active material particles is equal to or less than the thickness of the mixture layer. When the anode active material powder includes coarse particles having a size equal to or greater than the thickness of the mixture layer, the coarse particles are removed by sieve classification or air classification in advance to use the particles having the size equal to or less than the thickness of the mixture layer.

A solvent is added to a mixture including the anode active material and the binder. The mixture is sufficiently mixed or dispersed to prepare a slurry. Examples of the solvent are an organic solvent and water. Any solvent may be used as long as it does not degenerate the binder.

Method for forming a conductive layer on the surface of the binder is not limited as long as it can impart conductivity to the surface. An example of the method for forming the conductive layer will be described below. First, the binder is processed into a minute powder. The shape, size, and production method are the same as in the case of the binder used for the cathode. In the case of the anode, it is desirable that the size of the binder is also less than the thickness of the layer including the anode active material and that the size of the binder is equal to or under twice the length of the mean diameter of the anode active material particles, further preferably being equal to or less than the mean diameter of the anode active material particles.

The metals used for the surface of the binder include a metal which does not form an alloy or an intermetallic compound with lithium. If the metal forms an alloy with lithium, the alloy reacts with an electrolytic solution to form a coating (Solid-Electrolyte Interface) which does not easily allow electrons to pass through, or the metal falls off from the binder due to a change in volume of the metal to degenerate the binder having the conductive surface. A pure metal such as copper, nickel, iron, titanium, or an alloy containing these metals can be used for the metal. The metal is not limited to those stated above as long as it does not react with lithium. Since the action potential of the anode is low, the reactivity with lithium is more important than the problem of dissolution of the metal. Therefore, copper, nickel, iron and titanium are suitable for the anode. As a method for forming the surface having the metal, the plating method, mechanical fusion method and other methods can be used, as described in connection with the production method of the binder of the cathode.

If the thickness of the surface including the metal is too thick, the specific energy density of the battery disadvantageously decreases. If the thickness of the surface including the metal is too thin, cracks may be generated to disadvantageously cut off the electronic network. The conductive surface including the metal preferably has a thickness 10 nanometers or more and 300 nanometers or less. Particularly, the thickness from 10 nanometers to 200 nanometers is preferable since the surface unlikely to generate cracks when crushed by the active material particles and the shape can be flexibly deformed.

The binder produced by the method stated above is mixed with the anode active material to produce the anode. A slurry for the anode is prepared by mixing the anode active material and the binder and by mixing the resulting mixture with the solvent. Desirably, the solvent to be used is unlikely to penetrate the binder. This is because if the solvent penetrates the binder, the binder swells and the metal in the surface layer may peel off. To overcome this problem of peeling, an appropriate solvent is to be selected by adding the solvent to the binder including the conductive surface and checking the presence or absence of peeling of the surface after the binder has swelled.

The mixing ratio of the anode active material and the binder is within a range from 80:20 to 99:1 by weight ratio. In order to sufficiently exhibit the conductivity of the binder and enable charge and discharge with a large current, it is desirable that the proportion of the cathode active material is lower compared to the above mixing ratio of 99:1. In order to increase the specific energy density of the battery, it is preferable that the proportion of the cathode active material is larger compared to the mixing ratio of 90:10.

When the binder having the conductive surface is mainly used, that is, when the amount of the binder in the composition other than the anode active material in the mixture of the anode is larger than 50%, a carbonaceous conducting material or a binder with no metal coating can be added. Even if the carbonaceous conducting material and the binder are simultaneously used, the above three functions of the binder having the conductive surface are exhibited since the binder having the conductive surface is the main component. As the conducting material, known materials such as graphite, amorphous carbon, graphitizable carbon, carbon black, activated carbon, carbon fiber and carbon nanotube can be used. Conductive fibers include fibers produced by carbonizing raw materials such as vapor phase grown carbon or pitch (by-products such as petroleum, coal and coal tar) at a high temperature, and carbon fibers produced from acrylic fiber (Polyacrylonitrile).

The anode 108 is produced by applying the slurry stated above onto the anode current collector and by evaporating and drying the solvent. Any current collector can be used for the anode current collector, regardless of the material, shape, method for producing and other properties. For example, copper foils having a thickness of 10 to 100 μm, copper perforated foils having a thickness of 10 to 100 μm and a bore diameter of 0.1 to 10 mm, expand metals, foam metal sheets and other materials are used. As for the material, stainless steel, titanium, nickel, and other materials, in addition to copper, are applicable.

As applying the slurry onto the anode, any known method can be employed without limitation, such as the doctor blade method, dipping method and spraying method. The anode 108 can be produced by depositing the slurry for the anode onto the current collector, drying the organic solvent, and then pressing and forming the anode by roll pressing. Mixture layers can be laminated on the current collector by repeating steps from applying to drying several times.

It should be noted that above-mentioned binder having the conductive surface may be mixed into both the cathode and the anode or into either one of them. For example, the anode 108 may be produced by a conventional method and the cathode 107 can include the binder having the conductive surface. When a conventional method is employed for the production of the anode, the slurry for the anode is prepared by adding a solvent into a mixture of the anode active material and a conventional binder such as a fluorine-based or rubber-based binder. This slurry is applied onto the anode current collector and dried to produce the anode 108. Any current collector can be used for the anode current collector, regardless of the material, shape, method for producing and other properties. For producing the slurry for the anode, any of the known methods stated above can be employed without limitation.

The binder having the conductive surface is added to at least one of the cathode 107 and the anode 108. The separator 109 is inserted between the cathode 107 and the anode 108 to prevent a short circuit between the cathode 107 and the anode 108.

As the separator 109, polyolefin-based polymer sheets including polyethylene and polypropylene or a multilayer separator in which a polyolefin-based polymer and a fluorine-based polymer sheet typically including polyethylene tetrafluoride are welded can be used. To prevent shrinkage of the separator 109 when the battery temperature is raised, a thin layer of a mixture of a ceramic and the binder may be formed on the surface of the separator 109. The separator 109 needs to allow lithium ions to pass through during charging and discharging of the battery. Therefore, a separator having a pore diameter of 0.01 to 10 μm and a porosity of 20 to 90% can be generally used for the non-aqueous electrolyte secondary battery 101.

The separator 109 is also inserted between the electrode group and the battery container 102 so that the cathode 107 and anode 108 do not form a short circuit with the battery container 102. The separator 109, cathode 107 and anode 108 retain the electrolytic solution containing an electrolyte and a non-aqueous solvent on the surfaces and in the pores thereof.

As the electrolytic solution, a non-aqueous electrolytic solution prepared by dissolving salt including lithium in the solvent stated above can be used. Any such non-aqueous electrolytic solution can be appropriately used regardless of the type of the solvent and electrolyte and the mixing ratio of the solvent as long as it does not decompose on the cathode or the anode in the battery. Typical examples of the electrolytic solution include a solution prepared by dissolving lithium hexafluorophosphate ($LiPF_6$) or lithium tetrafluoroborate ($LiBF_4$) as an electrolyte in a solvent which is a mixture of ethylene carbonate and dimethyl carbonate, diethyl carbonate, or ethyl methyl carbonate. Solvents usable for the electrolytic solution include non-aqueous solvents such as propylene carbonate, ethylene carbonate, butylene carbonate, vinylene carbonate, γ-butyrolactone, dimethyl carbonate, diethyl carbonate, methyl ethyl carbonate, 1,2-dimethoxyethane, 2-methyl tetrahydrofuran, dimethyl sulfoxide, 1,3-dioxolane, formamide, dimethyl formamide, methyl propionate, ethyl propionate, trimethoxy methane, dioxolane, diethyl ether, sulfolane, 3-methyl-2-oxazolidinone, tetrahydrofuran, 1,2-diethoxyethane, chloroethylene carbonate, chloropropylene carbonate. Electrolytes usable for the electrolytic solution include various lithium salts such as $LiPF_6$, $LiBF_4$, $LiClO_4$, $LiCF_3SO_3$, $LiCF_3CO_2$, $LiAsF_6$ and $LiSbF_6$, which are represented by chemical formulas, and imide salts of lithium typically including lithium trifluoromethanesulfonimide.

It is preferable to add a fire-resistance material such as trimethyl phosphate, triethyl phosphate, trimethyl phosphite and triethyl phosphite to the electrolytic solutions stated above because combustion of the electrolytic solution can be prevented.

When a solid polymer electrolyte (polymer electrolyte) is used, ion conductive polymers, such as ethylene oxide, acrylonitrile, polyvinylidene difluoride, methyl methacrylate, and polyethylene oxide of hexafluoro propylene, can be used as an electrolyte. The electrolyte is used in a state of being contained in an ion conductive macromolecule. When these solid polymer electrolytes are used, the separator 109 can be advantageously omitted.

An ionic liquid can be used. For example, a suitable combination selected from 1-ethyl-3-methylimidazolium tetrafluoroborate ($EMI-BF_4$), a mixed complex of lithium salt $LIN(SO_2CF_3)_2$(LiTFSI), triglyme and tetraglyme, cyclic tertiary ammonium-based cation (N-methyl-N-propylpyrrolidinium, for example) and imide-based anion (bis(fluorosulfonyl)imide, for example) can be used for a non-aqueous electrolyte secondary battery, the combination not decomposing at the cathode and the anode.

An upper part of the electrode group is electrically connected to the external terminals via lead wires. The cathode 107 is connected to the cathode external terminal 104 via a cathode lead wire 110. The anode 108 is connected to the anode external terminal 105 via an anode lead wire 111. The lead wires 110, 111 may be in any form such as a linear shape or a plate. The shape and material of the lead wires 110, 111 are arbitrary as long as they have a low ohmic loss when current flows therethrough and do not react with the electrolytic solution.

Insulating seal materials 112 are inserted between the cathode external terminal 104 and the battery container 102 and between the anode external terminal 105 and the battery container 102 so that the two terminals do not form a short circuit through the lid 103. The insulating seal materials 112 can be selected from fluorine resins, thermosetting resins, glass hermetic seals, and any other materials which do not react with the electrolytic solution and have excellent airtightness.

A current interruption mechanism using a positive temperature coefficient (PTC) resistance element, if installed in the middle of the cathode lead wire 110 or the anode lead wire 111, at a connecting part of the cathode lead wire 110 and the cathode external terminal 104, or at a connecting part of the anode lead wire 111 and the anode external terminal 105, can stop charging and discharging of the non-aqueous electrolyte secondary battery 101 and protect the battery when the temperature is increased inside the battery.

The electrode group can have any structure, such as a laminate of the rectangular strip-shaped electrodes as shown in FIG. 1 or a winding in any shape including a cylindrical or flat shape. The battery container has a shape depending on the shape of the electrode group, such as cylindrical, elliptic, or square.

The material of the battery container 102 is selected from materials having corrosion resistance against the non-aqueous electrolyte, such as aluminum, stainless steel, and nickel-plated steel. When the battery container 102 is electrically connected to the cathode lead wire 110 or the anode lead wire 111, the material of the lead wires is selected so as to prevent corrosion of the battery container and degeneration of the material due to alloying with lithium ions in a portion in contact with the non-aqueous electrolyte. Thereafter, the lid 103 is tightly placed on the battery container 102 to tightly seal the entire battery. The methods for tightly sealing the battery include known techniques such as welding and swaging.

The electrolytic solution is injected by removing the lid 103 from the battery container 102 and directly adding the electrolytic solution to the electrode group or by adding the electrolytic solution from the liquid injection port 106 on the lid 103. The liquid injection port 106 of the lithium ion battery shown in FIG. 1 is placed on the top surface of the battery container 102. After the electrode group is accommodated in the battery container 102 and the battery container 102 is tightly sealed, the electrolytic solution including an electrolyte and a non-aqueous solvent is dropped from the liquid injection port 106 into the battery container 102. After a predetermined amount of the electrolytic solution is poured, the liquid injection port 106 is tightly sealed. A safety mechanism may be provided at the liquid injection port 106. A pressure valve for releasing the pressure inside the battery container may be provided as the safety mechanism.

The lithium ion battery according to the present invention has the electrode in which the electronic network is unlikely to deteriorate after charge-discharges cycles and has a long lifetime. Therefore, the lithium ion battery is suitable for mobile use such as electric vehicles and stationary use such as energy storage.

The present invention will be described below in further detail using Examples. It should be noted that specific components and parts may be changed in the scope of the present invention. Moreover, known techniques may be added and substituted as long as the components of the present invention are included in the non-aqueous electrolyte secondary battery.

EXAMPLE 1

In this Example, the following test was performed with a cathode produced by using a cathode active material $LiNi_{1/3}Mn_{1/3}Co_{1/3}O_2$ having a mean particle diameter of 10 μm, carbon black as a conducting material, and polyvinylidene difluoride (PVDF) as a binder. The weight composition of the cathode active material, the conducting material and the binder was 88:7:5. The area of the electrode covered with the slurry for the cathode was 10 cm×10 cm, and the thickness of the mixture layer was 50 μm. The cathode did not include a binder having the conductive surface.

An anode in this Example included natural graphite having a mean particle diameter of 15 μm and a binder having a Cu layer formed on the surface thereof. The binder covered with the metal is styrene-butadiene rubber (SBR). As a thickening agent, Equal amounts of carboxymethyl cellulose (CMC) and SBR were used. The mixing composition of the natural graphite and the binder was 98:2 by weight unit. The area of the electrode covered with the slurry for the anode was 10 cm×10 cm, and the thickness of the mixture layer was 30 μm.

Covering of the binder with the metal was performed by the electroless plating method by adding hydrazine to an aqueous solution of Cu nitrate. The binder before plating was SBR, which was pulverized in advance with a cutter mixer so that the size was 5 μm or less. The amount of the covering metal, which was measured by transmission electron microscopy observation, was measured to be in the range from 90 to 100%, although varying among particles of the binder. The thickness of the metal layer was in the range from 100 to 200 nm.

A slurry was prepared by mixing the anode powder and the binder having the conductive surface and by adding 2-propanol to the resulting mixture as a solvent. A planetary mixer and a dispersion mill were used for a dispersion process. The slurry was applied onto a copper foil having a thickness of 10 μm and the solvent was evaporated therefrom and dried. The mixture layer was compressed to have a density of 1.4 to 1.5 g/cm³ using a roll press machine.

The cathode 107 and the anode 108 were cut into a rectangular strip shape, and the separator 109 was inserted between the cathode 107 and the anode 108, producing an electrode group. The separator had a thickness of 25 μm and had a three-layered microporous structure including a polyethylene film and polypropylene films on both sides of the polyethylene. The electrodes and the separator were laminated to provide an electrode group, the number of laminates being 20 cells.

After the electrode group was accommodated in the battery container 102, an electrolytic solution was added from the liquid injection port 106. The electrolytic solution was prepared by dissolving 1 M $LiPF_6$ in a solvent which was a mixture of ethylene carbonate (EC) and dimethyl carbonate (DMC) in 1:2 by volume. A minute amount of vinylene carbonate was added as an additive in an amount of 1% with respect to the total volume of the electrolytic solution.

The lid 103 and the battery container 102 were welded, thereby producing five square lithium ion batteries shown in FIG. 1. These batteries were charged to 4.2 V at 5 hour rate (current value was 2 A) and then discharged to 3.0 V with a current at 1 hour rate (10 A). The capacity of the battery was 10±0.1 Ah at this time.

These batteries were placed in a thermostatic chamber at 40° C. and were subjected to a cycle test under the charge/discharge conditions stated above. After completing the test of 500 cycles, the battery temperature was returned to room temperature and a charge/discharge test was conducted under the same conditions. The results are shown in the row of Example 1 in Table 1. The capacity retention ratio (the ratio of the discharge capacity to the initial capacity 10±0.1 Ah) after 500 cycles was 91±2%.

COMPARATIVE EXAMPLE 1

Batteries were produced with the same configuration as in Example 1 of the present invention, except that the binder was replaced with SBR not covered with metal. The results are shown at Comparative Example 1 in Table 1. Comparing these results with the results of Example 1 reveals that the capacity retention ratio of the battery of the present invention is greatly improved. It is considered that the binder of the present invention can maintain the network of electrons following a change in volume of the anode active material due to the cycles.

EXAMPLE 2

Five square lithium ion batteries shown in FIG. 1 were produced under the same condition as in Example 1, except that the condition for producing the binder having the conductive surface was changed.

For the binder in Example 2, the time for metal covering was shortened so that the amount of the covering metal was about the half of the amount of the covering metal in Example 1. Hydrazine was added to an aqueous solution of Cu nitrate as in Example 1, and the reaction time was reduced by ½ to control the amount of copper reduced. It is also possible to control the amount of copper reduced by lowering the temperature. The amount of the covering metal, which was measured by transmission electron microscopy observation, was measured to be in the range from 40 to 60%, although varying among particles of the binder. The thickness of the metal layer was in the range from 40 to 100 nm. After the binder of the present invention was added to the anode and the density of the anode mixture layer was adjusted to 1.4 to 1.5 g/cm³, a transmission electron microscope photograph was taken.

According to the photograph, the metal layer was as thin as 10 nm in some portions due to the compression of the binder by graphite particle. However, even such a local thinning of the conductive surface occurred, test results described later (Example 2 in Table 1) show that the lifetime of the battery is improved.

Each of the five batteries produced in Example 2 was charged to 4.2 V at 5 hour rate (current value was 2 A) and then discharged to 3.0 V with a current at 1 hour rate (10 A). The capacity of the battery was 10±0.1 Ah at this time.

These batteries were placed in a thermostatic chamber at 40° C. and were subjected to a cycle test under the charge/discharge conditions stated above. After completing the test of 500 cycles, the battery temperature was returned to room temperature and a charge/discharge test was conducted under the same conditions. The results are shown in the row of Example 2 in Table 1. The capacity retention ratio (the ratio of the discharge capacity to the initial capacity 10±0.1 Ah) after 500 cycles was 89±2%. The reason why the capacity retention ratio was slightly lowered compared to the results of Example 1 is possibly related to a decrease in the amount of the metal covering the surface of the binder. However, compared to the results of Comparative Example 1, it is clear that the effects to improve the battery lifetime was obtained even when the thickness of the conductive surface was reduced under the conditions of Example 2.

EXAMPLE 3

Five square lithium ion batteries were produced employing an anode including a mixture of the binder of Example 1 and a binder with no copper deposited thereon.

The binder having the conductive surface (the same binder as in Example 1) and the binder with no copper deposited thereon were mixed at a volume ratio of 80:20. The resulting mixture was mixed with the natural graphite used in Example 1. The weight ratio of the natural graphite and the binder mixture was 90:10. The battery shown in FIG. 1 was produced with the other conditions being same as in Example 1, such as a condition for producing the anode, cathode specification, and composition of the electrolytic solution.

Each of the five batteries produced in Example 3 was charged to 4.2 V at 5 hour rate (current value was 2 A) and then discharged to 3.0 V with a current at 1 hour rate (10 A). The capacity of the battery was 10±0.1 Ah at this time.

These batteries were placed in a thermostatic chamber at 40° C. and were subjected to a cycle test under the charge/discharge conditions stated above. After completing the test of 500 cycles, the battery temperature was returned to room temperature and a charge/discharge test was conducted under the same conditions. The results are shown in the row of Example 3 in Table 1. The capacity retention ratio (the ratio of the discharge capacity to the initial capacity 10±0.1 Ah) after 500 cycles was 93±2%. The reason why the capacity retention ratio was slightly increased compared to the results of Example 1 is possibly that the binder whose surface was entirely covered with the metal maintained the network of electrons and a small amount of the binder without the covering metal enhanced the binding force.

EXAMPLE 4

A binder having a conductive surface was produced by using polyacrylic acid as a raw material of the binder and depositing Cu on the surface. The polyacrylic acid may be replaced with its lithium salt, sodium salt, or potassium salt. Copper was deposited by adding hydrazine to a solution of Cu nitrate in a water-alcohol mixture and applying the electroless plating method. The amount of the covering metal, which was measured by transmission electron microscopy observation, was measured to be in the range from 40 to 60%, although varying among particles of the binder. The thickness of the metal layer was in the range from 40 to 100 nm. The binder was mixed with the natural graphite used in Example 1. The weight ratio of the natural graphite and the binder was 90:10.

The battery shown in FIG. 1 was produced with the other conditions being same as in Example 1, such as a condition for producing the anode, cathode specification, and composition of the electrolytic solution. Each of the five batteries produced in Example 4 was charged to 4.2 V at 5 hour rate (current value was 2 A) and then discharged to 3.0 V with a current at 1 hour rate (10 A). The capacity of the battery was 10±0.1 Ah at this time.

These batteries were placed in a thermostatic chamber at 40° C. and were subjected to a cycle test under the charge/discharge conditions stated above. After completing the test of 500 cycles, the battery temperature was returned to room temperature and a charge/discharge test was conducted under the same conditions. The results are shown in the row of Example 4 in Table 1. The capacity retention ratio (the ratio of the discharge capacity to the initial capacity 10±0.1 Ah) after 500 cycles was 80±3%.

COMPARATIVE EXAMPLE 2

Batteries were produced with the same configuration as in Example 4 of the present invention, except that the binder was replaced with polyacrylic acid not covered with metal. The results are shown at Comparative Example 2 in Table 1. Comparing these results with the results of Example 4 reveals that the capacity retention ratio of the battery of the present invention is greatly improved. It is considered that the binder of the present invention can maintain the network of electrons following a change in volume of the anode active material due to the cycles.

EXAMPLE 5

A binder having a conductive surface was produced by using polyvinylidene difluoride (PVDF) as a raw material of the binder and depositing Cu on the surface. The PVDF was pulverized in advance with a cutter mixer so that the size was 5 μm or less. Copper was deposited by adding hydrazine to a solution of Cu nitrate in a water-alcohol mixture and applying the electroless plating method. The amount of the covering metal, which was measured by transmission electron microscopy observation, was measured to be in the range from 40 to 60%, although varying among particles of the binder. The thickness of the metal layer was in the range from 40 to 100 nm. The binder was mixed with the natural graphite used in Example 1. The weight ratio of the natural graphite and the binder was 90:10. The battery shown in FIG. 1 was produced with the other conditions being same as in Example 1, such as a condition for producing the anode, cathode specification, and composition of the electrolytic solution.

Each of the five batteries produced in Example 5 was charged to 4.2 V at 5 hour rate (current value was 2 A) and then discharged to 3.0 V with a current at 1 hour rate (10 A). The capacity of the battery was 10±0.1 Ah at this time.

These batteries were placed in a thermostatic chamber at 40° C. and were subjected to a cycle test under the charge/discharge conditions stated above. After completing the test of 500 cycles, the battery temperature was returned to room temperature and a charge/discharge test was conducted under the same conditions. The results are shown in the row of Example 5 in Table 1. The capacity retention ratio (the ratio of the discharge capacity to the initial capacity 10±0.1 Ah) after 500 cycles was 86±3%.

COMPARATIVE EXAMPLE 3

Batteries were produced with the same configuration as in Example 1 of the present invention, except that the binder was replaced with PVDF not covered with metal. The results are shown at Comparative Example 3 in Table 1. Comparing these results with the results of Example 5 reveals that the capacity retention ratio of the battery of the present invention is greatly improved. It is considered that the binder of the present invention can maintain the network of electrons following a change in volume of the anode active material due to the cycles.

EXAMPLE 6

A carbon-covered binder was produced by using a polyimide resin, which has thermoplasticity at a high temperature of 400° C. or more, as a raw material of the binder and by thermally decomposing a polyvinyl alcohol. First, a polyimide resin powder having an average size of 5 μm was produced by using a cutter mixer. A polyvinyl alcohol was added to the polyimide resin powder. The resulting mixture was homogenously mixed by a stirrer and was heat-treated at 200 to 300° C. in an argon gas atmosphere containing 1 to 5% of oxygen. A non-oxygen gas atmosphere, which lowers decomposition reaction speed, advantageously increases the yield of the carbon layer. A polyvinyl alcohol was carbonized on the surface of the binder by such a heat treatment, so that a carbon layer was formed on the polyimide resin powder. The thickness of the covering carbon was, which was measured by transmission electron microscopy observation, was measured to be mainly in the range from 20 to 60 nm, although varying among particles of the binder. After the anode mixture layer was compressed by roll pressing, the thickness of the carbon-covered layer compressed by the anode active material particles was measured to be in the range from 10 to 50 nm. The binder was mixed with the natural graphite used in Example 1. The weight ratio of the natural graphite and the binder was 95:5. The reason why the amount of the binder added was smaller than that in Example 1 was that the conductive surface was formed by carbon having a low density. The battery shown in FIG. 1 was produced with the other conditions being same as in Example 1, such as a condition for producing the anode, cathode specification, and composition of the electrolytic solution.

Each of the five batteries produced in Example 6 was charged to 4.2 V at 5 hour rate (current value was 2 A) and then discharged to 3.0 V with a current at 1 hour rate (10 A). The capacity of the battery was 10±0.1 Ah at this time.

These batteries were placed in a thermostatic chamber at 40° C. and were subjected to a cycle test under the charge/discharge conditions stated above. After completing the test of 500 cycles, the battery temperature was returned to room temperature and a charge/discharge test was conducted under the same conditions. The results are shown in the row of Example 6 in Table 1. The capacity retention ratio (the ratio of the discharge capacity to the initial capacity 10±0.1 Ah) after 500 cycles was 94±2%.

EXAMPLE 7

Five square lithium ion batteries shown in FIG. 1 were produced by applying a binder having a conductive surface to the cathode. The components produced in Example 1, such as the anode, the separator and the electrolytic solution, were used for the batteries except the cathode. The binder used in Example 7 is a binder produced by covering lithium polyacrylate with titanium. The powder of lithium polyacrylate was placed in a deposition apparatus to deposit titanium in a vacuum. After the deposition, the powder was sufficiently stirred and was again subjected to deposition. After a series of these steps were repeated 5 times, the powder was used for the binder of the cathode. The amount of the covering metal, which was measured by transmission electron microscopy observation, was measured to be in the range from 40 to 60%, although varying among particles of the binder. The thickness of the metal layer was in the range from 20 to 60 nm.

A slurry was prepared by mixing the cathode powder and the binder having the conductive surface and by adding 2-propanol to the resulting mixture as a solvent. A planetary mixer and a dispersion mill were used for a dispersion process. The slurry was applied onto an aluminum foil having a thickness of 20 μm and the solvent was evaporated therefrom and dried. The mixture layer was compressed to have a density of 3.4 to 3.7 g/cm$^3$ using a roll press machine. The thickness of the titanium surface in a portion compressed by the cathode active material particles was 10 to 50 nm.

Each of the five batteries produced in Example 7 was charged to 4.2 V at 5 hour rate (current value was 2 A) and then discharged to 3.0 V with a current at 1 hour rate (10 A). The capacity of the battery was 10±0.1 Ah at this time.

These batteries were placed in a thermostatic chamber at 40° C. and were subjected to a cycle test under the charge/discharge conditions stated above. After completing the test of 500 cycles, the battery temperature was returned to room temperature and a charge/discharge test was conducted under the same conditions. The results are shown in the row of Example 7 in Table 1. The capacity retention ratio (the ratio of the discharge capacity to the initial capacity 10±0.1 Ah) after 500 cycles was 95±2%. Compared to Example 1, a greater capacity retention ratio was obtained by combining the anode of Example 1 and the cathode of this Example.

The effects of adding the binder having the conductive surface to the cathode can be evaluated as a decrement of the capacity loss. In Example 1, the capacity retention ratio is 91±2% and the capacity loss, which is a difference between 100% and the capacity retention ratio, is 9±2%. In this Example, the capacity loss is 5±2%, which indicates the capacity is improved by about 4%.

EXAMPLE 8

Five square lithium ion batteries shown in FIG. 1 were produced. The cathode was produced according to the method in Example 7. The anode was produced according to the conditions in Example 6. The electrolytic solution was produced according to the composition in Example 1. Each of the five batteries produced in Example 8 was charged to 4.2 V at 5 hour rate (current value was 2 A) and then discharged to 3.0 V with a current at 1 hour rate (10 A). The capacity of the battery was 10±0.1 Ah at this time. These batteries were placed in a thermostatic chamber at 40° C. and were subjected to a cycle test under the charge/discharge conditions stated above. After completing the test of 500 cycles, the battery temperature was returned to room temperature and a charge/discharge test was conducted under the same conditions. The results are shown in the row of Example 2 in Table 1. The capacity retention ratio (the ratio of the discharge capacity to the initial capacity 10±0.1 Ah) after 500 cycles was 96±2%.

Compared to Example 1, a greater capacity retention ratio was obtained by combining the cathode of Example 7 and the anode of Example 6.

The effects of adding the binder having the conductive surface to the cathode can be evaluated as a decrement of the capacity loss. In Example 1, the capacity retention ratio is 91±2% and the capacity loss, which is a difference between 100% and the capacity retention ratio, is 9±2%. In this Example, the capacity loss is 4±2%, which indicates the capacity is improved by about 5%.

TABLE 1

Binders and battery performances

| | Electrically conductive layer | Metal thickness (nm) | Fraction of metal covering (%) | binder | Capacity retention ratio (%) after 500 cycles |
|---|---|---|---|---|---|
| Example 1 | Cu | 150 ± 50 | 95 ± 5 | SBR | 91 ± 2 |
| Example 2 | Cu | 70 ± 30 | 50 ± 10 | SBR | 89 ± 2 |
| Example 3 | Cu | 150 ± 50 | 95 ± 5 | SBR (see *1) | 93 ± 2 |
| Example 4 | Cu | 70 ± 30 | 50 ± 10 | Polyacrylic acid | 80 ± 3 |
| Example 5 | Cu | 70 ± 30 | 50 ± 10 | PVDF | 86 ± 3 |
| Example 6 | Carbon | 40 ± 20 | 50 ± 10 | Polyimide resin | 94 ± 2 |
| Example 7 | Ti | 40 ± 20 | 50 ± 10 | Lithium polyacrylate | 95 ± 2 |
| Comparative Example 1 | — | 0 | 0 | SBR | 80 ± 5 |
| Comparative Example 2 | — | 0 | 0 | Polyacrylic acid | 70 ± 5 |
| Comparative Example 3 | — | 0 | 0 | PVDF | 75 ± 5 |

*1. A binder not covered with a metal was mixed in an amount of 20% (by volume) of a binder covered with a metal.

EXAMPLE 9

Figure 2:
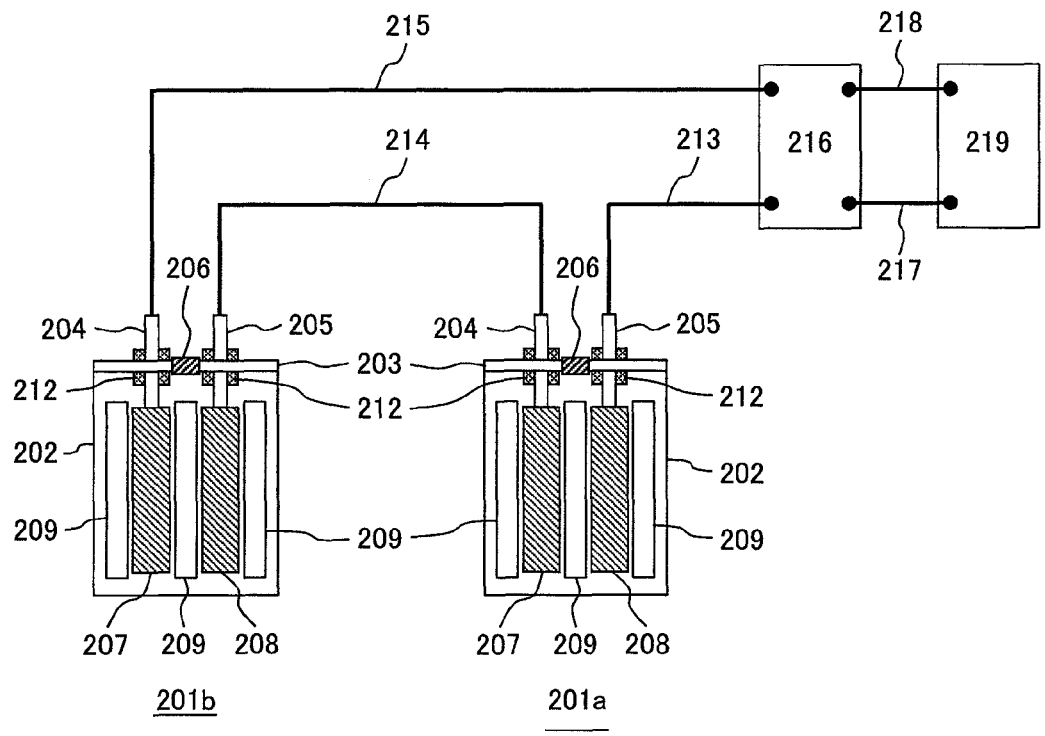
FIG. 2 shows an example of a battery system.

Two square lithium ion batteries having 50-Ah were produced by increasing the size of the electrodes and the number of laminates of the battery in Example 3 by 5 times. FIG. 2 shows a battery system in which these non-aqueous electrolyte secondary batteries 201a, 201b are serially connected. This system is referred to as S1.

Each of the non-aqueous electrolyte secondary batteries 201a, 201b includes a battery container 202 containing an electrode group. The electrode group includes a cathode 207, an anode 208 and a separator 209 and has the same specification between batteries 201a, 201b. A cathode external terminal 204 and an anode external terminal 205 are provided on the top surface of a lid 203. An insulating seal material 212 is inserted between each of the external terminals 204, 205 and the lid 203 so that the two external terminals do not form a short circuit through the lid 203. In FIG. 2, the number of the cathode and anode is one for each battery. However, actually, twenty of the cathodes 207 and twenty of anodes 208 are alternately laminated via the separators 209. The insulating seal material 212 is inserted between each external terminal and the battery container 202 for the two external terminals not to form a short circuit. In FIG. 2, the parts corresponding to the cathode lead wire 110 and the anode lead wire 111 in FIG. 1 are omitted, although the inner structures of the non-aqueous electrolyte secondary batteries 201a, 201b are the same as that in FIG. 1. A liquid injection port 206 was provided in an upper part of the lid 203.

The anode external terminal 205 of the non-aqueous electrolyte secondary battery 201a is connected to the anode input terminal of a charge/discharge controller 216 by a power cable 213. The cathode external terminal 204 of the non-aqueous electrolyte secondary battery 201a is connected to the anode external terminal 205 of the non-aqueous electrolyte secondary battery 201b via a power cable 214. The cathode external terminal 204 of the non-aqueous electrolyte secondary battery 201b is connected to the cathode input terminal of the charge/discharge controller 216 by a power cable 215. Such a wiring structure enables the two non-aqueous electrolyte secondary batteries 201a, 201b to be charged or discharged.

The charge/discharge controller 216 transfers electric power to and from an externally installed device (hereinafter referred to as external device) 219 via power cables 217, 218. The external device 219 includes various kinds of electrical machinery and apparatuses, such as an external power source for supplying power to the charge/discharge controller 216 and a regenerative motor, and inverters, converters and loads which are supplied with power by this system. Components such as an inverter may be provided depending on whether the current flows alternately or directly in the external device. Any known electrical machinery, apparatuses and devices can be employed as these devices.

The non-aqueous electrolyte secondary batteries 201a, 201b are normally charged to obtain the rated capacity. For example, a constant voltage charge of 4.2 V can be performed for one hour with charge current of 0.5 hour rate (25 A). Charge conditions, which are determined by design of the battery such as a property and amounts of the materials used for the lithium ion battery, should be appropriately selected depending on the specification of the battery.

After the non-aqueous electrolyte secondary batteries 201a, 201b are charged, the charge/discharge controller 216 is switched to a discharge mode to discharge the batteries. Normally, discharging is stopped when the voltage reaches a certain lower limit voltage. In this experiment, the lower limit voltage of each battery was 3.0 V.

In the system S1 described above, the external device 219 was operated to supply power during charging and to consume power during discharging. In this Example, the batteries were charged at 2 hour rate and are discharged at 1 hour rate. An initial discharge capacity was determined. As a result, 99.5 to 100% capacity of the design capacity 50 Ah of the non-aqueous electrolyte secondary batteries 201a, 201b was obtained. Thereafter, the cycle of charging at 2 hour rates and discharging at 1 hour rate under the condition of an environmental temperature of 20 to 30° C. was repeated 500 times. As a result, capacities as high as 98 to 99% of the initial discharge capacity were obtained. It was found that the charge-discharge cycle of this Example hardly affects the performance of the system S1. If the external device 219 is replaced with drive units such as electric motors, the system S1 can be utilized as power sources for electric vehicles, hybrid electric vehicles, carrying implements, construction machinery, nursing equipment, light vehicles, electric tools, game machines, video equipment, television sets, vacuum cleaners, robots, mobile data terminal devices, power sources for isolated islands and space stations, ships, underwater explorers, and submarines.

EXAMPLE 10

Figure 3:
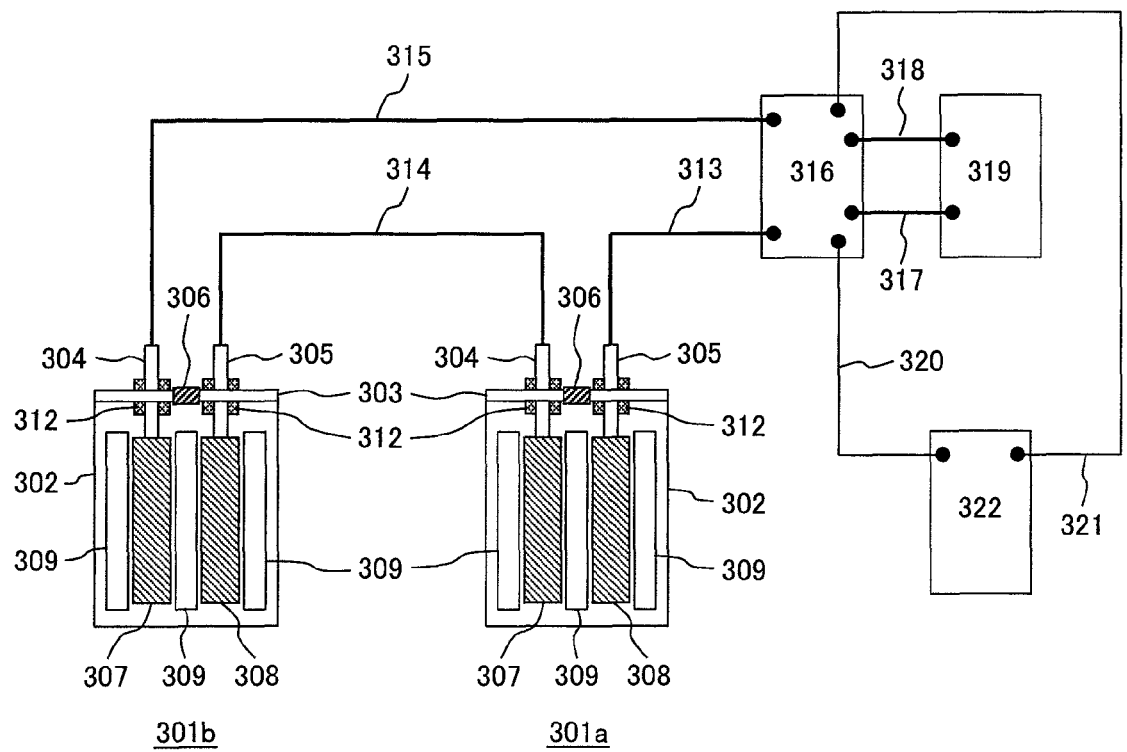
FIG. 3 shows another example of a battery system.

A square lithium ion battery having the same specification as that of Example 9 was produced. The capacity of the battery was 50 Ah under 1 hour rate discharge condition. FIG. 3 shows a battery system in which two non-aqueous electrolyte secondary batteries 301a, 301b are serially connected. This system is referred to as S2.

Each of the non-aqueous electrolyte secondary batteries 301a, 301b includes a battery container 302 containing an electrode group. The electrode group includes a cathode 307, an anode 308 and a separator 309 and has the same specification between batteries 301a, 301b. A cathode external terminal 304 and an anode external terminal 305 are provided on the top surface of a lid 303. An insulating seal material 312 is inserted between each of the external terminals 304, 305 and the lid 303 so that the two external terminals do not form a short circuit through the lid 303. In FIG. 3, the parts corresponding to the cathode lead wire 110 and the anode lead wire 111 in FIG. 1 are omitted, although the inner structures of the non-aqueous electrolyte secondary batteries 301a, 301b are the same as that in FIG. 1. A liquid injection port 306 was provided in an upper part of the lid 303.

The anode external terminal 305 of the non-aqueous electrolyte secondary battery 301a is connected to the anode input terminal of a charge/discharge controller 316 by a power cable 313. The cathode external terminal 304 of the non-aqueous electrolyte secondary battery 301a is connected to the anode external terminal 305 of the non-aqueous electrolyte secondary battery 301b via a power cable 314. The cathode external terminal 304 of the non-aqueous electrolyte secondary battery 301b is connected to the cathode input terminal of the charge/discharge controller 316 by a power cable 315. Such a wiring structure enables the two non-aqueous electrolyte secondary batteries 301a, 301b to be charged or discharged.

The charge/discharge controller 316 transfers electric power to and from an externally installed device (hereinafter referred to as external device) 319 via power cables 317, 318. The external device 319 includes various kinds of electrical machinery and apparatuses, such as an external power source for supplying power to the charge/discharge controller 316 and a regenerative motor, and inverters, converters and loads which are supplied with power by this system. Components such as an inverter may be provided depending on whether the current flows alternately or directly in the external device. Any known electrical machinery, apparatuses and devices can be employed as these devices.

Moreover, a power generator 322 was placed, which simulated operational conditions of a wind power generator as a device generating renewable energy. The power generator 322 was connected to the charge/discharge controller 316 via power cables 320, 321. When the power generator 322 generates power, the charge/discharge controller 316 switches to a charge mode to supply power to the external device 319, and surplus power is utilized for charging the non-aqueous electrolyte secondary batteries 301a and 312b. When the amount of power generation, which simulates power generation by a wind power generator, is lower than the power required by the external device 319, a charge/discharge controller 316 operates to discharge the non-aqueous electrolyte secondary batteries 301a and 312b. The power generator 322 can be replaced with any other power generators, such as solar batteries, geothermal power generators, fuel cells, and gas turbine generators. The charge/discharge controller 316 stores a program for enabling the power generators to automatically perform the operation stated above.

The non-aqueous electrolyte secondary batteries 301a, 301b are normally charged to obtain the rated capacity. For example, a constant voltage charge of 4.2 V can be performed for 0.5 hour with charge current of 1 hour rate. Charge conditions, which are determined by design of the battery such as a property and amounts of the materials used for the lithium ion battery, should be appropriately selected depending on the specification of the battery.

After the non-aqueous electrolyte secondary batteries 301a, 301b are charged, the charge/discharge controller 316 is switched to a discharge mode to discharge the batteries. Normally, discharging is stopped when the voltage reaches a certain lower limit voltage.

In the system S2 described above, the external device 319 was operated to supply power during charging and to consume power during discharging. In this Example, the batteries were charged at 2 hour rate and are discharged at 1 hour rate. An initial discharge capacity was determined. As a result, 99.5 to 100% capacity of the design capacity 50 Ah of the non-aqueous electrolyte secondary batteries 301a, 301b was obtained.

Thereafter, the charge-discharge cycle test stated below was performed under the condition of an environmental temperature of 20 to 30° C. First, the batteries were charged with a current at 2 hour rate (25 A). When the state of charge has reached 50% (the state of being charged to 25 Ah), a 5 second pulse in the charge direction and a 5 second pulse in the discharge direction were given to the non-aqueous electrolyte secondary batteries 301a, 301b, whereby a pulse test was conducted, simulating power reception from the power generator 322 and power supply to the external device 319. The magnitudes of both of the current pulses were 150 A. Successively, the remaining capacity 25 Ah were charged with a current at 2 hour rate (25 A) until the voltage of each of the batteries reaches 4.2 V. A constant voltage charge was performed at the voltage of 4.2 V for one hour, and then the charge was terminated. Thereafter, discharge was performed with a current at 1 hour rate (50 A) until the voltage of each of the batteries reached 3.0V. Such a series of charge-discharge cycle test was repeated 500 times. As a result, capacities as high as 98 to 99% of the initial discharge capacity were obtained. It was found that the performance of S2 is hardly lowered even if the current pulses of power reception and power supply were given to the batteries. The method of this Example can provide a lithium ion battery which enables charging and discharging with large current.

EXAMPLE 11

A lithium-air battery with a long life can be provided, including an air electrode which reacts with oxygen as the cathode, an anode which occludes and releases lithium ions, where the air electrode or the anode employs the conductive binder of the present invention. The graphite anode in Example 1 is used as the anode. The air electrode is a porous sheet electrode, including 70% $MnO_2$ powder by weight and 30% conductive binder of Example 7 by weight. A polyethylene oxide sheet (the thickness is 100 μm) was inserted between the cathode and the anode. The polyethylene oxide sheet allows lithium ions to pass through the sheet and blocks off air so that oxygen does not pass through from the air electrode. The gas supplied to the air electrode was set to pass through a molecular sieve to be dried. The environmental temperature was retained at 50° C., and the lithium-air battery was subjected to a charge/discharge test at a current density of 0.1 mA/cm$^2$ (per area of the anode). As a result, it was found that the capacity retention ratio after 50 cycles was 80%.

What is claimed is:

1. A non-aqueous electrolyte secondary battery comprising:
   a cathode;
   an anode; and a non-aqueous electrolytic solution containing an electrolyte;

wherein at least one of the cathode and the anode comprises an active material, a current collector, and a binder located therebetween, the binder comprising an elastic binder and a metal plate formed on the surface of the elastic binder.

2. The non-aqueous electrolyte secondary battery according to claim 1, wherein the metal plate further comprises carbon on the surface thereof.

3. The non-aqueous electrolyte secondary battery according to claim 1, wherein at least one of the cathode and the anode further comprises another binder not including a conductive plate on the surface thereof.

4. The non-aqueous electrolyte secondary battery according to claim 1, wherein the metal plate comprises a metal which does not form an alloy with lithium in an action potential of an electrode.

5. The non-aqueous electrolyte secondary battery according to claim 2, wherein the metal plate comprises a metal that does not form an alloy with lithium in an action potential of an electrode.

6. The non-aqueous electrolyte secondary battery according to claim 1, wherein the metal plate comprises at least one of copper, nickel, iron, titanium, aluminum and an alloy thereof.

7. The non-aqueous electrolyte secondary battery according to claim 2, wherein the metal plate comprises at least one of copper, nickel, iron, titanium, aluminum and an alloy thereof.

8. The non-aqueous electrolyte secondary battery according to claim 1, wherein the metal plate has a thickness of 10 to 300 nanometers.

9. The non-aqueous electrolyte secondary battery according to claim 1, wherein the metal plate comprises a uniform film including a metal or a layer including a metal covering a part of the surface of the binder.

10. The non-aqueous electrolyte secondary battery according to claim 1, wherein the cathode comprises the active material, the current collector, and the binder, and the metal plate comprises at least one of titanium and aluminum.

11. The non-aqueous electrolyte secondary battery according to claim 1, wherein the anode comprises the active material, the current collector, and the binder, and the metal plate comprises at least one of copper, nickel, iron and titanium.

12. The non-aqueous electrolyte secondary battery according to claim 1, wherein the active material comprises particles of the active material.

13. A non-aqueous electrolyte secondary battery comprising:

a cathode;

an anode; and a non-aqueous electrolytic solution containing an electrolyte;

wherein at least one of the cathode and the anode comprises particles of an active material, a current collector, and a binder located therebetween, the binder comprising a powder having an inner part containing an elastic material and a metal plate formed on the surface of the elastic binder.

* * * * *